W. M. OFFUTT & G. E. HUBBARD.
NUT LOCK.
APPLICATION FILED JAN. 13, 1908.
911,063.
Patented Feb. 2, 1909.
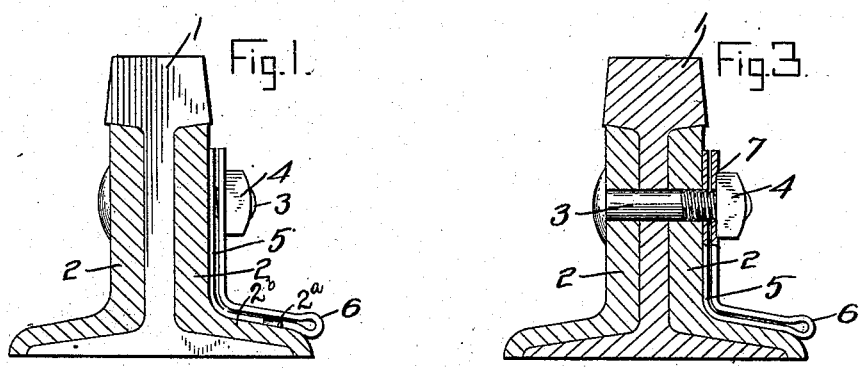
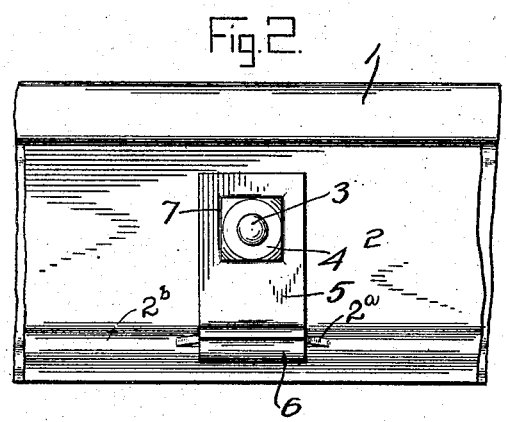
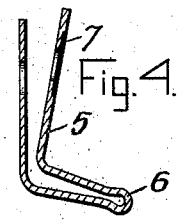
Witnesses
E. K. Reichenbach
M. O. Rowling
Inventors.
W. M. Offutt & G. E. Hubbard.
By D. Swift & Co.
Attorneys

UNITED STATES PATENT OFFICE.

WILLIAM M. OFFUTT AND GEORGE E. HUBBARD, OF TERRE HAUTE, INDIANA.

NUT-LOCK.

No. 911,063.  Specification of Letters Patent.  Patented Feb. 2, 1909.

Application filed January 13, 1908. Serial No. 410,711.

*To all whom it may concern:*

Be it known that we, WILLIAM M. OFFUTT and GEORGE E. HUBBARD, citizens of the United States, residing at Terre Haute, in the county of Vigo and State of Indiana, have invented a new and useful Nut-Lock; and we do hereby declare the following to be a full, clear, and exact description of the invention, such as will enable others skilled in the art to which it appertains to make and use the same.

The invention relates to nut locks and has for its object to provide a simple, inexpensive and durable device of this character especially adapted for use on rail joints, but which can be advantageously used for other purposes.

With these and other objects in view, the invention consists in the novel construction and arrangement of parts, hereinafter described and shown and particularly pointed out in the appended claim.

In the drawing, Figure 1 is a section of a rail joint showing our invention applied thereto. Fig. 2 is a side view of the device. Fig. 3 is a sectional view taken through the bolt and nut. Fig. 4 is a sectional view taken through the loop.

Referring to the drawings, 1 designates a rail on which are arranged fish plates 2 which are connected to said rail by a bolt 3, having a nut 4. Between one of the fish plates and the nut 4, is a compound washer 5. The washer 5 consists of a strip of resilient metal bent upon itself, and forming a loop 6. The washer 5 is provided on its outer face with a rectangular recess 7, which is adapted to receive the nut 8, when the same is tightly screwed up. One of the fish plates 2 has the upper face of its horizontal flange $2^b$ provided with lugs $2^a$, between which the horizontal or the looped portion 6 of the washer 5 is disposed, as seen clearly in Figs. 1 and 2. Should the bolt begin to yield in course of time, the loop 6 which exerts a spring action, would cause the compound washer to spread or open and thus keep the nut still in the rectangular recess, by which said nut would be effectually prevented from rotating or unscrewing.

What is claimed is,

In a device as set forth, the combination of a rail and its fish plates, of means for securing the fish plates and the rail together, comprising a bolt extending through said rail and the fish plates, a nut threaded upon the end of said bolt, a washer composed of a single strip of metal bent upon itself to form a horizontal or looped portion 6, and having its free end portions bent at an angle and engaging between the said nut and one of the fish-plates whereby the said rail and fish plates may be resiliently held together, said fish plates comprising horizontal lower flanges $2^b$, one of said flanges having lugs $2^a$ between which said looped portion 6 is disposed, as and for the purpose specified.

In testimony whereof we have signed our names to this specification in the presence of two subscribing witnesses.

WILLIAM M. OFFUTT.
GEORGE E. HUBBARD.

Witnesses:
 ISAAC MASTERS,
 T. T. PEYTON.